(12) United States Patent
Park

(10) Patent No.: US 12,573,125 B2
(45) Date of Patent: Mar. 10, 2026

(54) MESH TEXTURE METHOD FOR GENERATING TRUE ORTHOPHOTO USING GEOMETRIC INFORMATION AND THE SYSTEM THEREOF

(71) Applicant: HyperCloud Co., Ltd, Seoul (KR)

(72) Inventor: Kyoung Kuy Park, Seoul (KR)

(73) Assignee: HyperCloud Co., Ltd, Seoul (KR)

( * ) Notice: Subject to any disclaimer, the term of this patent is extended or adjusted under 35 U.S.C. 154(b) by 138 days.

(21) Appl. No.: 18/511,437

(22) Filed: Nov. 16, 2023

(65) Prior Publication Data

US 2025/0037348 A1     Jan. 30, 2025

(30) Foreign Application Priority Data

Jul. 28, 2023   (KR) ........................ 10-2023-0098749
Oct. 26, 2023   (KR) ........................ 10-2023-0144450

(51) Int. Cl.
*G06T 15/04* (2011.01)
*G06T 7/70* (2017.01)
*G06T 17/20* (2006.01)
*G06T 19/00* (2011.01)

(52) U.S. Cl.
CPC ............... *G06T 15/04* (2013.01); *G06T 7/70* (2017.01); *G06T 17/20* (2013.01); *G06T 19/00* (2013.01); *G06T 2200/04* (2013.01); *G06T 2207/10032* (2013.01); *G06T 2219/004* (2013.01)

(58) Field of Classification Search
CPC ........... G06T 15/04; G06T 7/70; G06T 17/20; G06T 19/00; G06T 2200/04; G06T 2207/10032; G06T 2219/004
See application file for complete search history.

(56) References Cited

U.S. PATENT DOCUMENTS

| | | | |
|---|---|---|---|
| 8,150,146 B1 * | 4/2012 | Payton | G06V 20/13 |
| | | | 348/42 |
| 9,171,402 B1 * | 10/2015 | Allen | G06T 19/003 |
| 2015/0193963 A1 * | 7/2015 | Chen | G06T 17/05 |
| | | | 345/426 |
| 2018/0357778 A1 * | 12/2018 | Komeichi | G06T 15/04 |
| 2020/0334890 A1 | 10/2020 | Li et al. | |

FOREIGN PATENT DOCUMENTS

| | | | | |
|---|---|---|---|---|
| EP | 3413266 B1 * | 2/2024 | | G06T 5/50 |
| JP | 2018-205264 A | 12/2018 | | |

* cited by examiner

*Primary Examiner* — Abderrahim Merouan
(74) *Attorney, Agent, or Firm* — Hayes Soloway PC

(57) ABSTRACT

Disclosed is a mesh texture method and system for generating a true orthophoto based on a nadir image using geometric information of an orientation and a position, including receiving a sky view image and a three-dimensional (3D) mesh; filtering the sky view image into an image candidate group using geometric information of a 3D mesh face and selecting an optimal nadir image available as a texture from the image candidate group; and generating a true orthophoto based on the nadir image.

7 Claims, 14 Drawing Sheets

Seam Correction (a)           (b)

Mesh Face

Sobel Image

Camera

MESH TEXTURE METHOD FOR GENERATING TRUE ORTHOPHOTO USING GEOMETRIC INFORMATION AND THE SYSTEM THEREOF

CROSS-REFERENCE TO RELATED APPLICATIONS

This application claims the priority benefit of Korean Patent Application Nos. 10-2023-0098749 filed on Jul. 28, 2023, and 10-2023-0144450 filed on Oct. 26, 2023 in the Korean Intellectual Property Office, the disclosures of which are incorporated herein by reference.

BACKGROUND

1. Field of the Invention

Example embodiments relate to a mesh texture method and system for generating a true orthophoto using geometric information, and more particularly, a mesh texture technique for generating a true orthophoto based on a nadir image using geometric information of an orientation and a position.

2. Description of the Related Art

A conventional mesh texturing technique generates a textured mesh through an image selection and seam correction process. Here, the conventional mesh texturing technique goes through a process of generating a texture by selecting an appropriate image corresponding to each mesh face and correcting a seam between textures. However, in the case of generating a true orthophoto using the conventional mesh texturing technique, issues arise in a gradient-based image selection and processing rate.

As a first issue, an image selection method of the conventional mesh texturing technique is designed to select an image with a high definition and a location parallel to a face in order to generate a texture based on a gradient within a face area projected onto an image. However, this method does not select a nadir image that is advantageous to generate a true orthophoto.

As a second issue, the conventional mesh texturing technique selects an appropriate image by minimizing an energy function using an iterative optimization technique. However, this method may require a relatively long processing time.

To overcome such limitations found in the conventional mesh texturing technique, proposed is a mesh texture technique for selecting a nadir image using geometric information of an orientation and a position and generating a true orthophoto based on the nadir image.

SUMMARY

An objective of at least one example embodiment is to select a nadir image suitable for a true orthophoto using geometric information of an orientation and a position of a mesh face and a shooting camera.

An objective of at least one example embodiment is to provide a technique for more quickly generating a texture suitable for a true orthophoto by selecting a nadir image using geometric information of an orientation and a position.

However, the technical subjects to be solved by the disclosure are not limited to the aforementioned subjects and may be variously expanded without departing from technical spirit and scope of the disclosure.

According to an aspect of at least one example embodiment, there is provided a mesh texture method for generating a true orthophoto using geometric information, the mesh texture method including receiving a sky view image and a three-dimensional (3D) mesh; filtering the sky view image into an image candidate group using geometric information of a 3D mesh face and selecting an optimal nadir image available as a texture from the image candidate group; and generating a true orthophoto based on the nadir image.

According to an aspect of at least one example embodiment, there is provided a mesh texture system for generating a true orthophoto using geometric information, the mesh texture system including a receiver configured to receive a sky view image and a 3D mesh; an image selector configured to filter the sky view image into an image candidate group using geometric information of a 3D mesh face and to select an optimal nadir image available as a texture from the image candidate group; and a generator configured to generate a true orthophoto based on the nadir image.

According to some example embodiments, since a computationally complex optimization technique is not used by selecting a nadir image suitable for a true orthophoto using geometric information of an orientation and a position of a mesh face and a shooting camera, it is possible to more quickly generate a texture.

However, the effects of the disclosure are not limited to the aforementioned effects and may be variously expanded without departing from technical spirit and scope of the disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
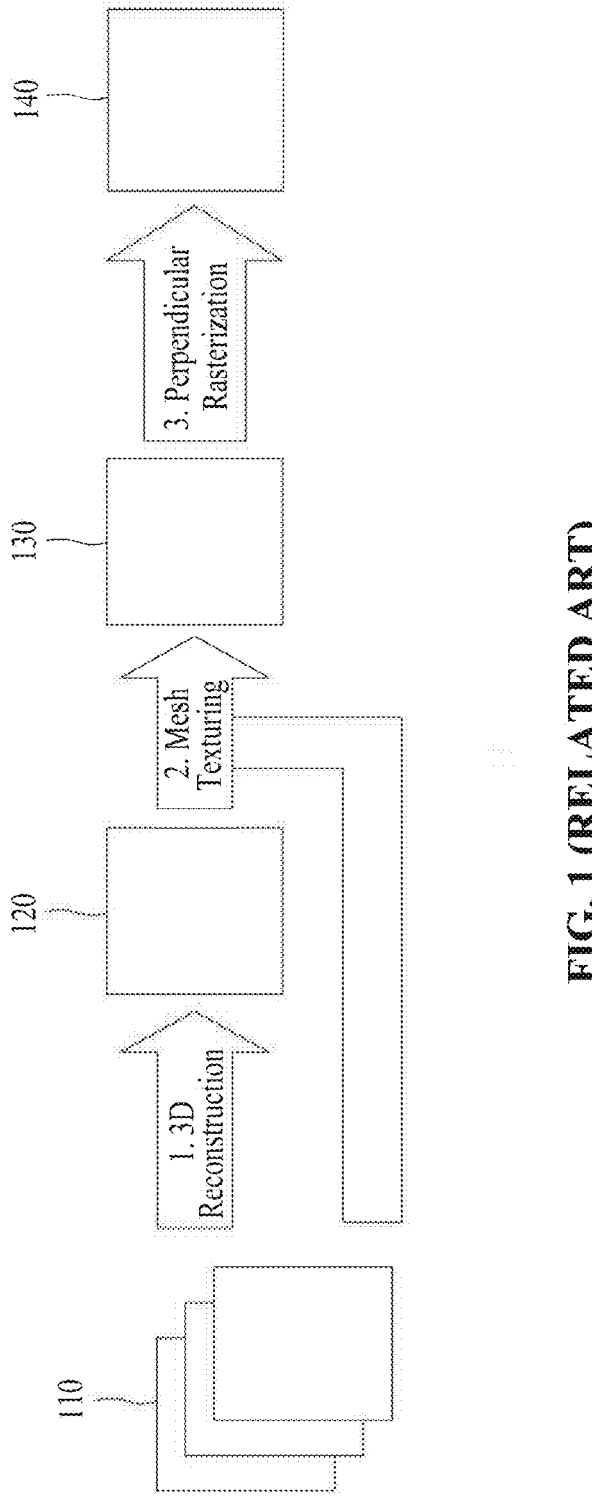
FIGS. 1 to 4 illustrate a conventional mesh texturing technique.

Advantages and features of the disclosure and methods to achieve the same will become apparent with reference to example embodiments described with the accompanying drawings. However, the disclosure is not limited to the example embodiments set forth herein and may be implemented in various forms. The example embodiments are provided to ensure that the disclosure is complete and to fully inform one skilled in the art to which the disclosure pertains of the scope of the disclosure and the disclosure is defined by the claims.

The terms used herein are for the purpose of describing specific example embodiments only and are not to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, the example embodiments will be further described with reference to the accompanying drawings. Like reference numerals refer to like elements through and further description related thereto is omitted.

FIGS. 1 to 4 illustrate a conventional mesh texturing technique.

Referring to FIG. 1, a method of generating a true orthophoto using a conventional mesh texturing technique generates a three-dimensional (3D) mesh 120 by performing 3D reconstruction using a plurality of sky view images 110 captured at various views, generates a textured 3D mesh 130 by performing mesh texturing on the 3D mesh 120 and the sky view images 110, and generates a true orthophoto 140 by performing perpendicular rasterization of the textured 3D mesh 130. Here, the sky view image 110 includes captured location information of a camera.

Figure 2:
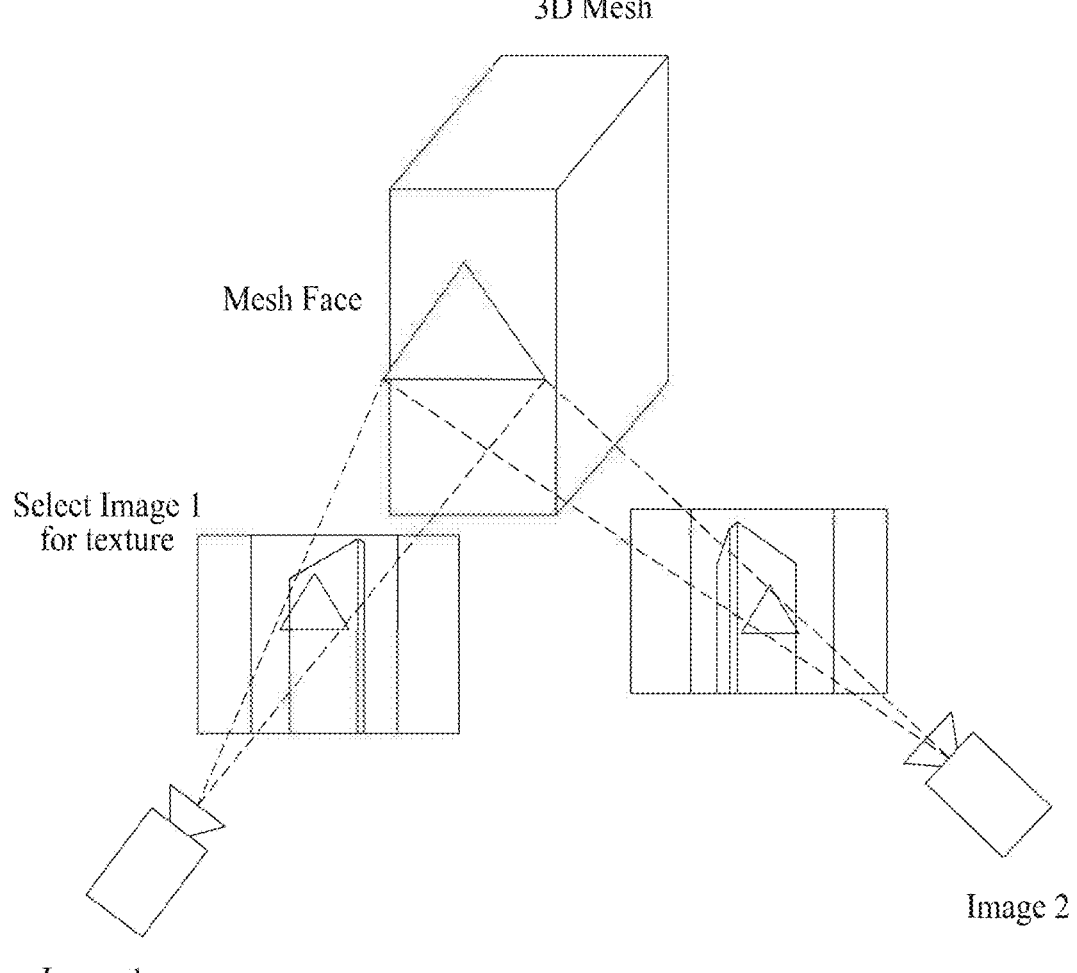
Figure 3:
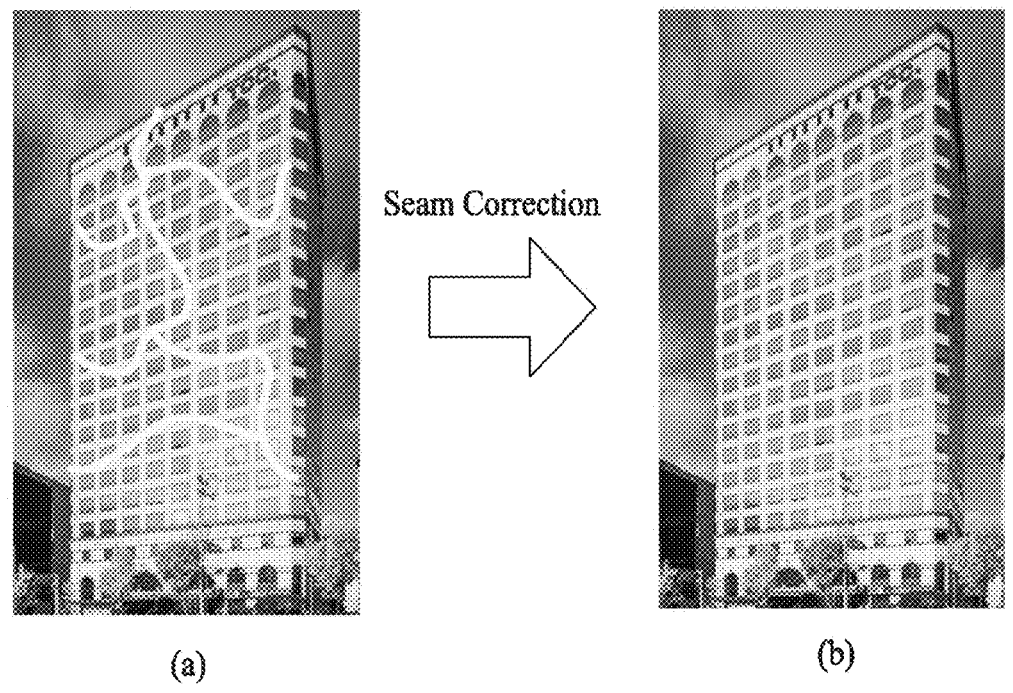

In detail, the conventional mesh texturing technique selects a gradient-based image through an optimization technique using a sky view image and a 3D mesh, including location information of a shooting camera (image selection, see FIG. 2) and generates image labeling information on a mesh face. Then, the conventional mesh texturing technique generates a texture patch and performs seam correction of global seam correction and local seam correction as illustrated in FIG. 3. Here, (a) of FIG. 3 represents a mesh with a texture seam and (b) of FIG. 3 represents a result, that is, an output of performing the seam correction.

Figure 4:
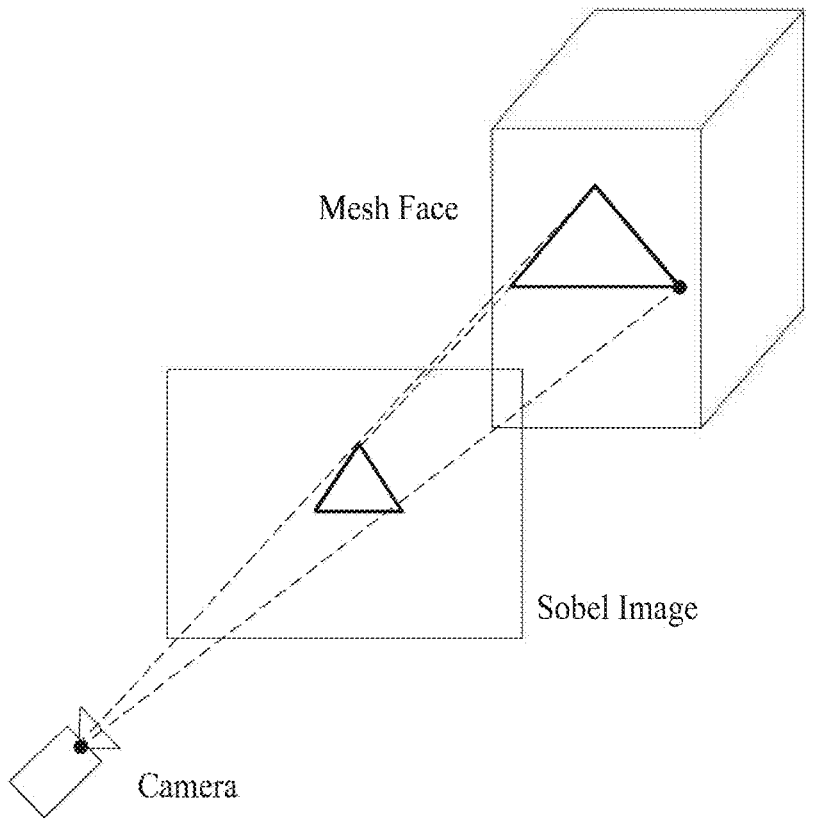

Describing an energy function of the conventional mesh texturing technique with reference to FIG. 4, the conventional mesh texturing technique selects an image with a minimum energy function using a Markov random field (MRF) optimization. Here, the image with the minimum energy function includes a gradient-based data term and smooth term. The data term includes a sum of gradients within a face area projected onto a sobel image.

Figure 5:
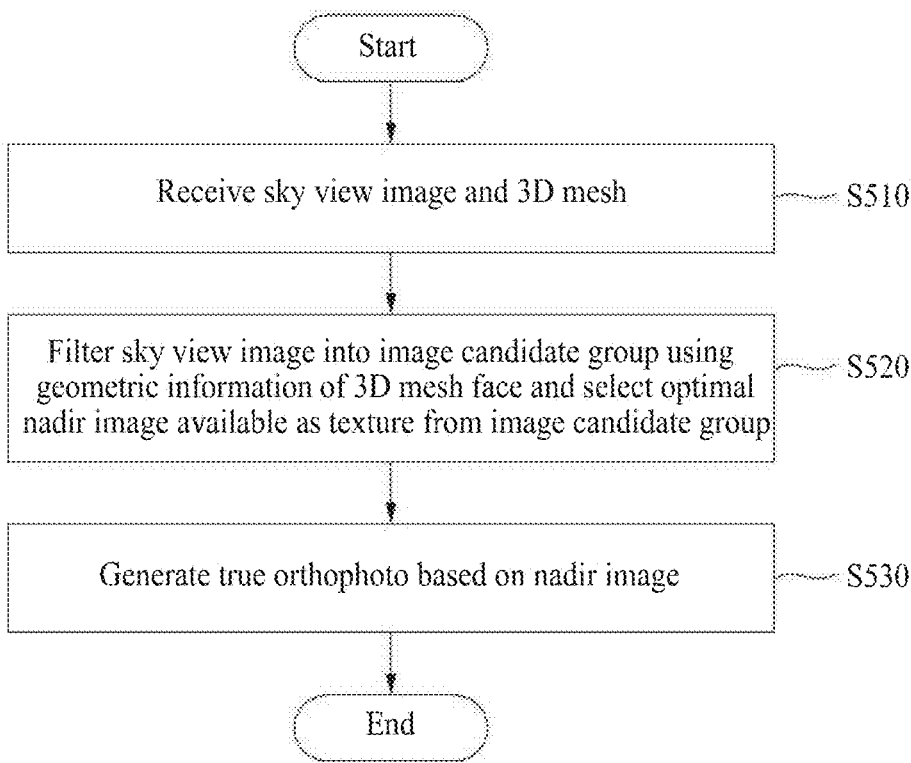
FIG. 5 is a flowchart illustrating a mesh texture method for generating a true orthophoto according to an example embodiment.
Figure 6:
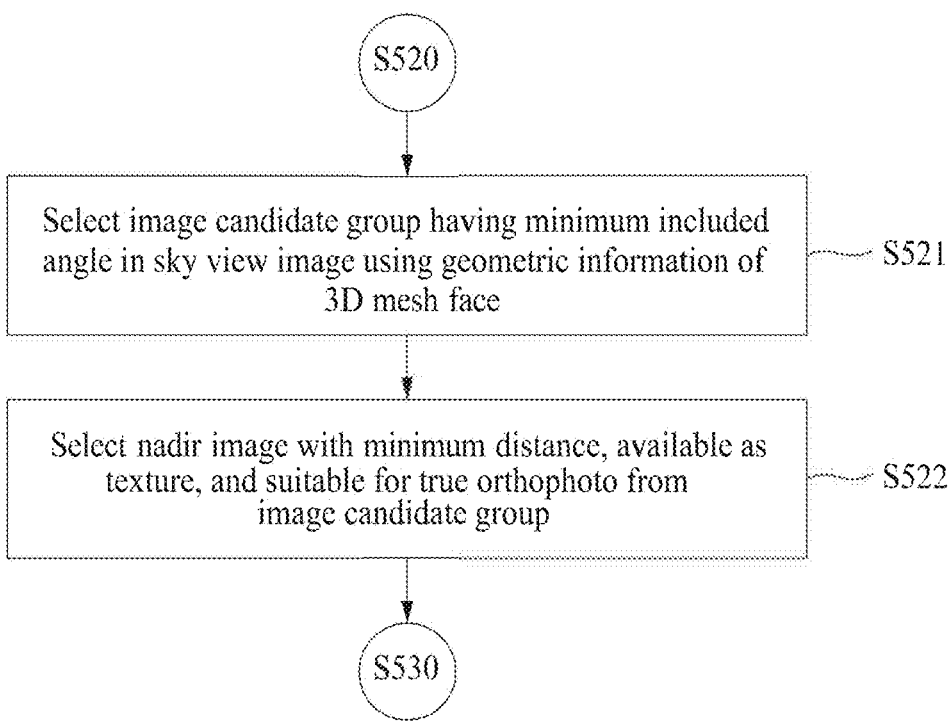
FIG. 6 is a flowchart illustrating an operation of selecting a nadir image in detail according to an example embodiment.
Figure 7:
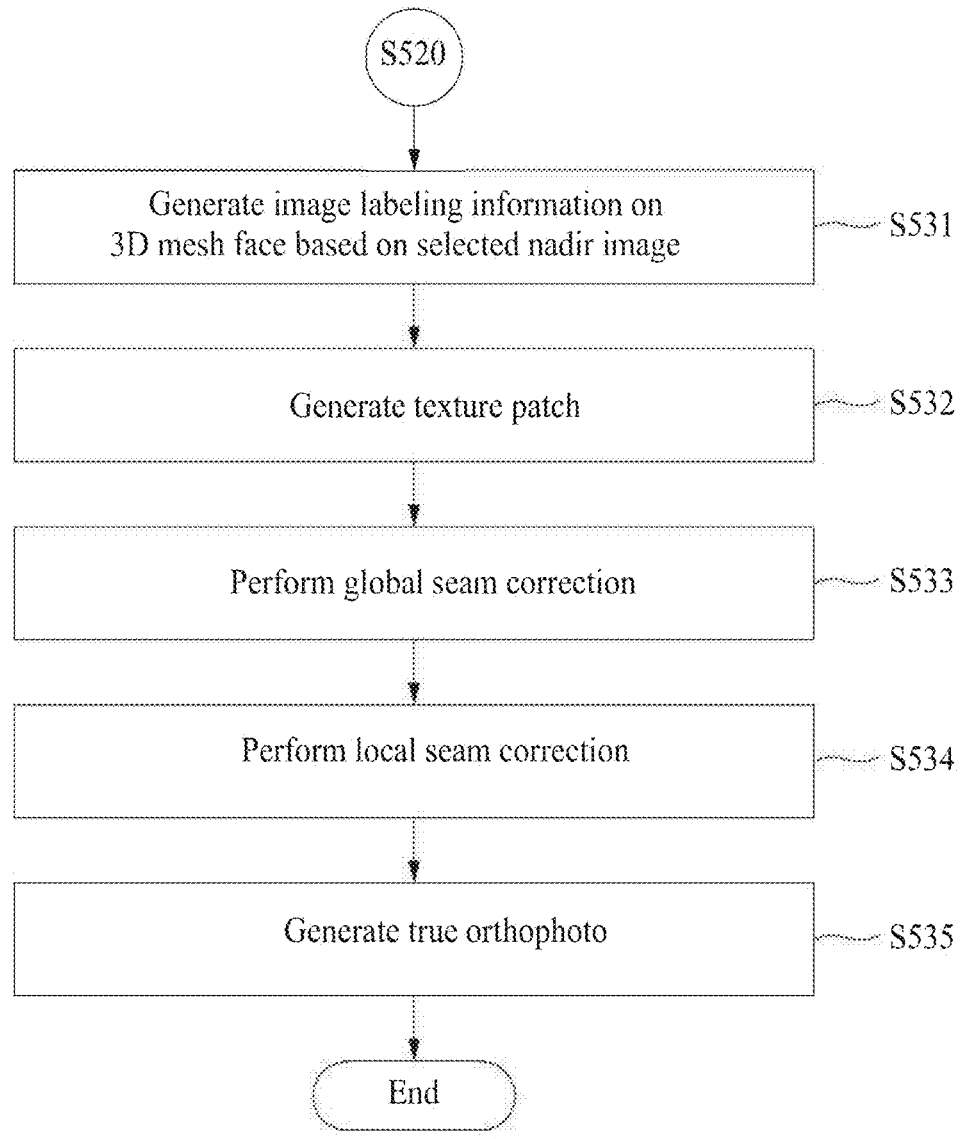
FIG. 7 is a flowchart illustrating an operation of generating a true orthophoto in detail according to an example embodiment.

FIG. 5 is a flowchart illustrating a mesh texture method for generating a true orthophoto according to an example embodiment. Also, FIG. 6 is a flowchart illustrating an operation of selecting a nadir image in detail according to an example embodiment and FIG. 7 is a flowchart illustrating an operation of generating a true orthophoto in detail according to an example embodiment.

Figure 8:
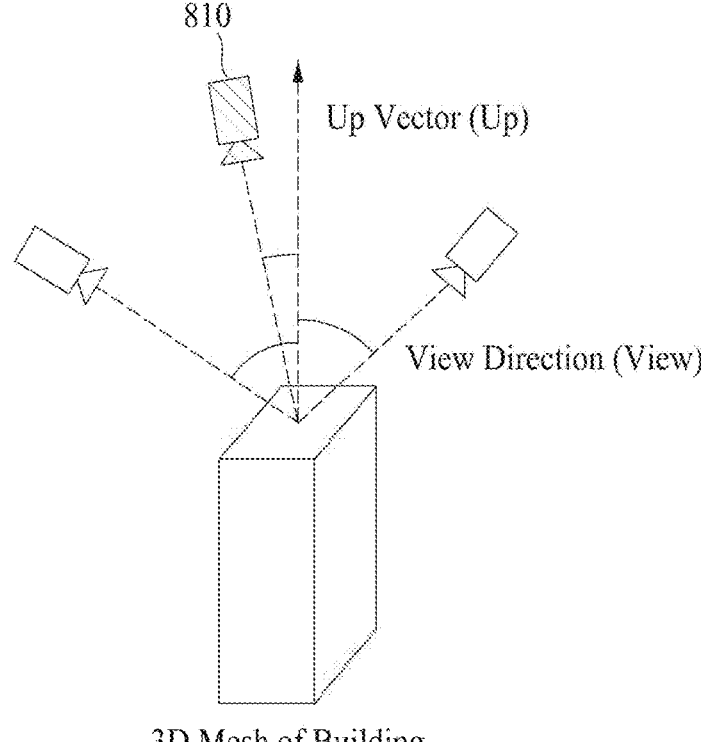
FIG. 8 illustrates an example of explaining image candidate filtering using an orientation according to an example embodiment.
Figure 9:
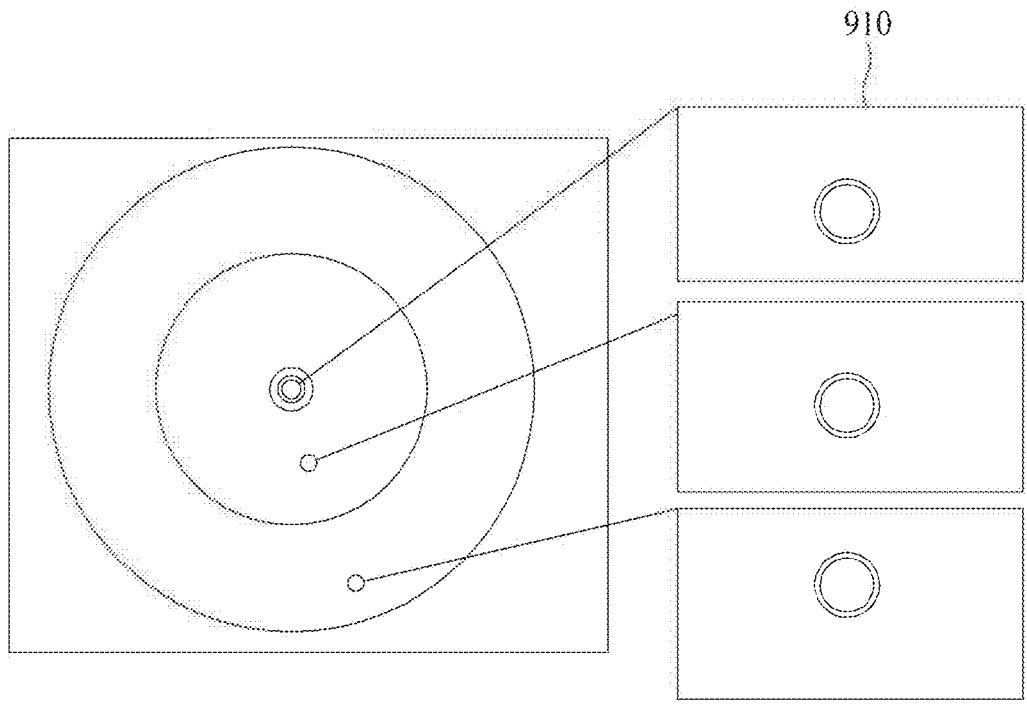
FIGS. 9 and 10 illustrate examples of explaining an image selection using a position according to an example embodiment.
Figure 10:
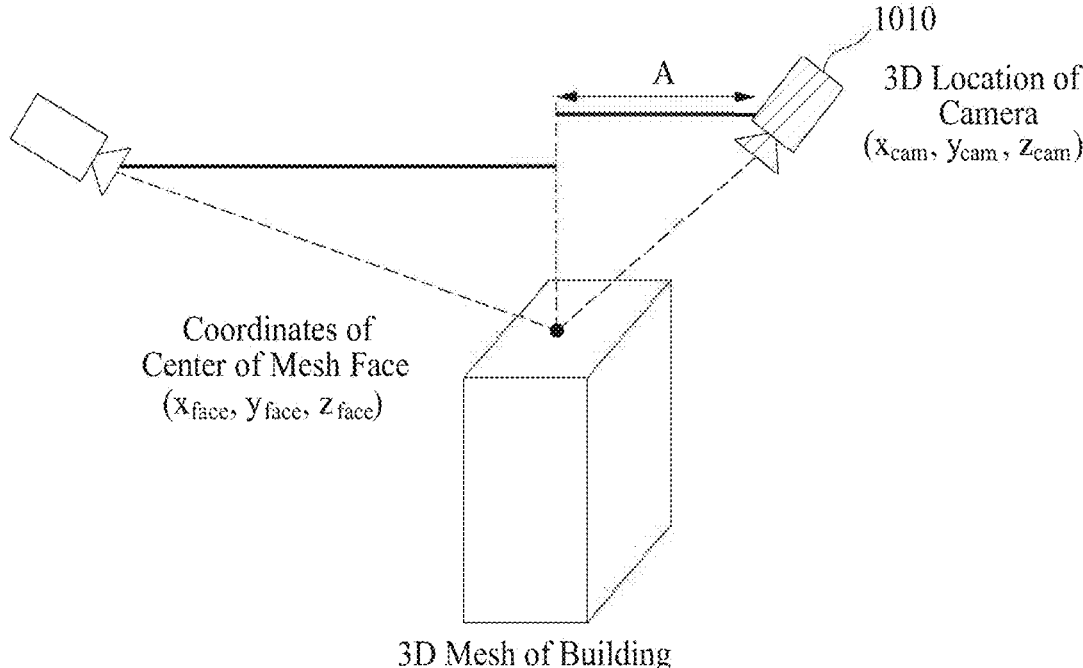

Also, FIG. 8 illustrates an example of explaining image candidate filtering using an orientation according to an example embodiment, and FIGS. 9 and 10 illustrate examples of explaining an image selection using a position according to an example embodiment.

Figure 13:
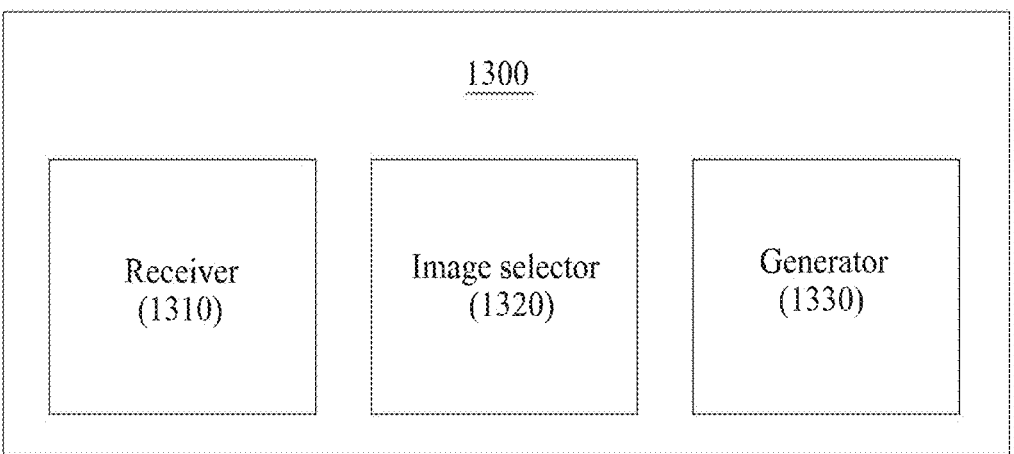
FIG. 13 is a diagram illustrating a configuration of a mesh texture system for generating a true orthophoto using geometric information according to an example embodiment.

Operations S510 to S530 of the mesh texture method for generating a true orthophoto according to an example embodiment illustrated in FIG. 5 is performed by a receiver 1310, an image selector 1320, and a generator 1330 of a mesh texture system 1300 for generating a true orthophoto according to an example embodiment illustrated in FIG. 13.

Referring to FIG. 5, in operation S510, a sky view image and a 3D mesh are received.

Operation S510 may receive the sky view image acquired by at least one of an aviation, a drone, and an artificial satellite, location information of a shooting camera that captures the sky view image, and the 3D mesh. Here, the 3D mesh refers to a set of polygons and vertices that constitute a shape of a polyhedron in 3D computer graphics. A mesh is generally constructed with triangles and quadrilaterals, or convex polygons to enable simple rendering, but may also be constructed using more complex shapes, such as a shape with holes. The aforementioned 3D mesh is also used in the conventional mesh texturing technique described above with reference to FIGS. 1 to 4 and thus, further description is omitted.

In operation S520, the sky view image is filtered into an image candidate group using geometric information of a 3D mesh face and an optimal nadir image available as a texture is selected from the image candidate group.

Describing operation S520 according to an example embodiment in detail with reference to FIG. 6, operation S520 may include a first operation (operation S521) of selecting the image candidate group having a minimum included angle in the sky view image using the geometric information of the 3D mesh face and a second operation (operation S522) of selecting a nadir image having a minimum distance, available as the texture, and suitable for the true orthophoto from the image candidate group. Here, as illustrated in FIG. 2, the 3D mesh face applies the optimization technique using the sky view image and the 3D mesh and represents a corresponding area in which the sky view image is applied to the 3D mesh based on a gradient.

Operation S521 may select the image candidate group using an orientation in the geometric information of the 3D mesh face. Describing in detail with reference to FIG. 8, operation S521 may filter an image with an included angle between an up vector and a view direction of less than 30 degrees (e.g., a location of a camera 810) in the sky view image into the image candidate group using the orientation. Using a 3D mesh of a building as an example, when an included angle between an up vector and a view direction in a sky view is less than 30 degrees based on the up vector that is a perpendicular direction of the building in a sky view image of the building, the corresponding sky view image may be filtered into an image candidate group selectable as a nadir image. That is, the shooting camera having captured the sky view image of the building needs to be present within an included angle between the camera 810 and the up vector in FIG. 8.

Also, operation S521 may select a corresponding image as the image candidate group selectable as the nadir image as an included angle between a view direction and an up vector is closer to zero in the sky view image. The closer the view direction toward the building in the sky view image of the building is to the up vector, the more advantageous it may be in selecting as the nadir image.

Operation S522 may select the nadir image using a position in the geometric information of the 3D mesh face. Referring to FIG. 9, operation S522 may select an image close to a location of the 3D mesh face as a nadir image 910 from the image candidate group filtered in operation S521 using the position. In FIG. 9, two images below the selected nadir image 910 represent images that gradually move away from the 3D mesh face. It can be seen that the included angle between the up vector and the view direction also increases as the image becomes farther away from the 3D mesh face.

Describing operation S522 in detail with reference to FIG. 10, operation S522 may extract an image with a closest horizontal distance (A) between a 3D mesh face and a shooting camera 1010 from the image candidate group and may select the extracted image as the nadir image. Using a 3D mesh of a building as an example, a 3D location of a shooting camera having captured the building based on coordinates of the center of a 3D mesh face needs to be present at a horizontal distance closest to the 3D mesh face and an image captured from the shooting camera present at the closest horizontal distance may be selected as the nadir image.

In operation S530, the true orthophoto is generated based on the nadir image.

Referring to FIG. 7, operation S530 may include operation S531 of generating image labeling information on the 3D mesh face based on the selected nadir image, operation S532 of generating a texture patch, operation S533 of performing global seam correction, operation S534 of performing local seam correction, and operation S555 of generating the true orthophoto.

In operation S531, when the nadir image suitable for the 3D mesh face is selected using the geometric information, image labeling information on the 3D mesh face may be generated. The image labeling information represents information on a pair of a face identifier and a selected image identifier. Therefore, corresponding information is used when generating the texture patch.

The texture patch generation of operation S532 refers to a process of extracting a 3D mesh texture from the selected image. Operation S532 fetches an image used to generate the texture using the image labeling information generated in operation S531, camera information on the corresponding image, and face information. Then, operation S532 may project the face onto the image in a camera direction of the captured sky view image, may find an image patch area corresponding to the face, and may generate the same as a patch.

The seam correction of operations S533 and S534 refers to a process of generating a natural seam between patches. When generating a patch, patches are generated from images having different luminance and thus, connection between the patches is not natural. To solve this, the seam correction of operations S533 and S534 may be performed. Here, the global seam correction adjusts the overall luminance of a face patch using optimization and the local seam correction corrects a color of a peripheral area of a patch using a Poisson image editing technique to correct luminance that is not corrected with the global seam correction.

Operations S531 to S535 are also used in the conventional mesh texturing technique and thus, further description is omitted.

Figure 11A:
FIGS. 11A-11B illustrate a result image of a true orthophoto derived from each of a mesh texture technique for generating a true orthophoto according to an example embodiment and a conventional mesh texturing technique.
Figure 11B:

FIGS. 11A and 11B illustrate a result image of a true orthophoto derived from each of a mesh texture technique for generating a true orthophoto according to an example embodiment and a conventional mesh texturing technique. Also, FIG. 12 illustrates a processing time result of each of a mesh texture technique for generating a true orthophoto according to an example embodiment and a conventional mesh texture technique.

FIG. 11A illustrates the result image of the true orthophoto derived using the conventional mesh texture technique and FIG. 11B illustrates the result image of the true orthophoto derived using the mesh texture technique for generating the true orthophoto according to an example embodiment. Referring to FIGS. 11A and 11B, compared to the conventional mesh texturing technique, the proposed mesh texture technique can be seen to reduce a phenomenon of bending by incorrect mesh geometry and does not show the side of a building since a nadir image is used.

Figure 12:
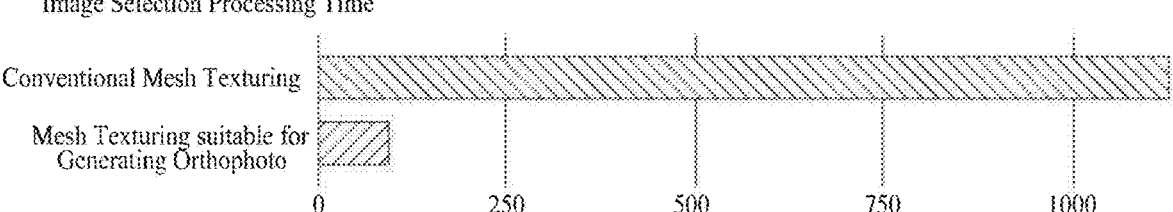
FIG. 12 illustrates a processing time result of each of a mesh texture technique for generating a true orthophoto according to an example embodiment and a conventional mesh texturing technique.

Referring to FIG. 12, since an image selection processing time using the conventional mesh texturing technique is 1129.434 sec and an image selection processing time using the proposed mesh texture technique is 93.381 sec, it can be seen that the proposed technique processes an image selection about 12.09 times more quickly than the conventional technique.

FIG. 13 is a diagram illustrating a configuration of a mesh texture system for generating a true orthophoto using geometric information according to an example embodiment.

The mesh texture system for generating the true orthophoto using geometric information according to an example embodiment of FIG. 13 proposes a mesh texture technique for selecting a nadir image using geometric information of an orientation and a position and generating a true orthophoto based on the nadir image.

To this end, a mesh texture system 1300 for generating a true orthophoto using geometric information according to an example embodiment includes a receiver 1310, an image selector 1320, and a generator 1330.

The receiver 1310 receives a sky view image and a 3D mesh.

The receiver 1310 may receive the sky view image acquired by at least one of an aviation, a drone, and an artificial satellite, location information of a shooting camera that captures the sky view image, and the 3D mesh. Here, the 3D mesh refers to a set of polygons and vertices that constitute a shape of a polyhedron in 3D computer graphics. A mesh is generally constructed with triangles and quadrilaterals, or convex polygons to enable simple rendering, but may also be constructed using more complex shapes, such as a shape with holes.

The image selector 1320 filters the sky view image into an image candidate group using geometric information of a 3D mesh face and selects an optimal nadir image available as a texture from the image candidate group.

The image selector 1320 may perform a first operation of selecting the image candidate group having a minimum included angle in the sky view image using the geometric information of the 3D mesh face and a second operation of selecting a nadir image having a minimum distance, available as the texture, and suitable for the true orthophoto from the image candidate group. Here, as illustrated in FIG. 2, the 3D mesh face applies the optimization technique using the sky view image and the 3D mesh and represents a corresponding area in which the sky view image is applied to the 3D mesh based on a gradient.

In the first operation, the image selector 1320 may select the image candidate group using an orientation in the geometric information of the 3D mesh face. The image selector 1320 may filter an image with an included angle between an up vector and a view direction of less than 30 degrees in the sky view image into the image candidate group using the orientation. Using a 3D mesh of a building as an example, when an included angle between an up vector and a view direction in a sky view is less than 30 degrees based on the up vector that is a perpendicular direction of the building in a sky view image of the building, the image selector 1320 may filter the corresponding sky view image into the image candidate group selectable as a nadir image.

Also, the image selector 1320 may select a corresponding image as the image candidate group selectable as the nadir image as an included angle between a view direction and an up vector is closer to zero in the sky view image. The closer the view direction toward the building in the sky view image of the building is to the up vector, the more advantageous it may be in selecting as the nadir image.

In the second operation, the image selector 1320 may select the nadir image using a position in the geometric information of the 3D mesh face. The image selector 1320 may select an image close to a location of the 3D mesh face as a nadir image from the image candidate group filtered in operation S521 using the position. In detail, the image selector 1320 may extract an image with a closest horizontal distance (A) between a 3D mesh face and a shooting camera from the image candidate group and may select the extracted image as the nadir image. Using a 3D mesh of a building as an example, a 3D location of a shooting camera having captured the building based on coordinates of the center of a 3D mesh face needs to be present at a horizontal distance closest to the 3D mesh face and an image captured from the shooting camera present at the closest horizontal distance may be selected as the nadir image.

The generator 1330 generates the true orthophoto based on the nadir image.

The generator 1330 may generate image labeling information on the 3D mesh face based on the selected nadir image, may generate a texture patch, may perform global seam correction, may perform local seam correction, and may generate the true orthophoto. Here, the aforementioned process of the generator 1330 is used in the conventional mesh texturing technique and thus, further description is omitted.

Although the corresponding description is omitted in the system of FIG. 13, it will be apparent to one of ordinary skill in the art that each component constituting FIG. 13 may include all the contents described with reference to FIGS. 1 to 12.

The systems or the apparatuses described herein may be implemented using hardware components, software components, and/or combination of the hardware components and the software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the example embodiments may be recorded in non-transitory computer-readable media including program instructions to implement various operations embodied by a computer. Also, the media may include, alone or in combination with the program instructions, data files, data structures, and the like. Program instructions stored in the media may be those specially designed and constructed for the example embodiments, or they may be well-known and available to those having skill in the computer software arts. Examples of the media include magnetic media such as hard disks, floppy disks, and magnetic tapes; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The hardware device may be configured to operate as one or more software modules to perform the operations of the example embodiments, or vice versa.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. A mesh texture method for generating a true orthophoto using geometric information, the mesh texture method comprising:

receiving a sky view image, obtained by at least one of an aircraft, a drone, or a satellite, together with camera position information, and a three-dimensional (3D) mesh;

filtering the sky view image into candidate images using geometric information of a mesh face of the three-dimensional (3D) mesh;

filtering the sky view image into candidate images using geometric information of a mesh face of the three-dimensional mesh, wherein the filtering comprises a first step of selecting candidate images having an orientation angle smaller than a predetermined threshold between an up vector of the mesh face and a view direction of the camera;

selecting, among the candidate images, a nadir image through a second step of selecting the image having (i) the smallest angle formed between the up vector and the view direction of the camera, and (ii) the least horizontal distance between the mesh face and the camera position, to be used as a texture; and generating a true orthophoto based on the nadir image.

2. The mesh texture method of claim 1, wherein the first operation filters an image with an included angle of less than 30 degrees in the sky view image into the image candidate group using the orientation.

3. The mesh texture method of claim 2, wherein the first operation selects a corresponding image as the image candidate group selectable as the nadir image as an included angle between a view direction and an up vector is closer to zero in the sky view image.

4. The mesh texture method of claim 1, wherein the second operation selects an image close to a location of the 3D mesh face as the nadir image from the image candidate group using the position.

5. The mesh texture method of claim 4, wherein the second operation extracts an image with a closest horizontal distance between the 3D mesh face and the shooting camera from the image candidate group and selects the extracted image as the nadir image.

6. The mesh texture method of claim 1, wherein the generating comprises:

generating image labeling information on the 3D mesh face based on the selected nadir image;

generating a texture patch;

performing global seam correction;

performing local seam correction; and generating the true orthophoto.

7. A mesh texture system for generating a true orthophoto using geometric information, comprising:

a receiver configured to receive a sky view image, obtained by at least one of an aircraft, a drone, or a satellite, together with camera position information, and a three-dimensional (3D) mesh;

an image selector configured to filter the sky view image into candidate images using geometric information of a mesh face of the three-dimensional mesh, wherein the filtering comprises a first step of selecting candidate images having an orientation angle smaller than a predetermined threshold between an up vector of the mesh face and a view direction of the camera, and a second step of selecting, among the candidate images, a nadir image having (i) the smallest angle formed between the up vector and the view direction of the camera, and (ii) the least horizontal distance between the mesh face and the camera position, as the nadir image to be used as a texture; and a generator configured to generate a true orthophoto based on the selected nadir image.

* * * * *